US008555750B2

(12) United States Patent
Riestra

(10) Patent No.: US 8,555,750 B2

(45) Date of Patent: Oct. 15, 2013

(54) AUTO-ADJUSTABLE BEARING WRENCH

(75) Inventor: Antonio Cami Riestra, Lleida (ES)

(73) Assignees: Luis Gerardo Oyervides Ochoa, Monterrey, Nuevo Leon (MX); Antonio Cami Riestra, Lleida (ES)

(*) Notice: Subject to any disclaimer, the term of this patent is extended or adjusted under 35 U.S.C. 154(b) by 402 days.

(21) Appl. No.: 12/950,408

(22) Filed: Nov. 19, 2010

(65) Prior Publication Data

US 2011/0203420 A1 Aug. 25, 2011

(30) Foreign Application Priority Data

Feb. 22, 2010 (MX) .................... MX/a/2010/002057

(51) Int. Cl.
*B25B 13/46* (2006.01)
*F16D 41/00* (2006.01)

(52) U.S. Cl.
USPC ................................................ 81/59.1; 81/60

(58) Field of Classification Search
USPC ................ 81/59.1, 60, 58.1, 58.3, 58.4, 58.5; 192/45.001, 45.005, 45.006, 45.007
See application file for complete search history.

(56) References Cited

U.S. PATENT DOCUMENTS

| | | | | |
|---|---|---|---|---|
| 2,232,090 | A * | 2/1941 | Anderson | 192/45.005 |
| 5,535,647 | A * | 7/1996 | Donaldson, Jr. | 81/59.1 |
| 6,070,499 | A | 6/2000 | Wisbey | |
| 6,481,656 | B2 * | 11/2002 | Jeong | 192/45.01 |
| 7,036,400 | B2 * | 5/2006 | Matsumoto et al. | 81/59.1 |
| 7,444,902 | B1 | 11/2008 | Lin et al. | |
| 7,458,295 | B1 | 12/2008 | Lu et al. | |

* cited by examiner

*Primary Examiner* — Hadi Shakeri

(74) *Attorney, Agent, or Firm* — Birch, Stewart, Kolasch & Birch, LLP

(57) ABSTRACT

A bearing wrench comprising a casing as main support, with at least one piston coupling hole, a synchronizing device, and closing caps, power cylinder, a cylinder thrust spring and a connection screw between the boxes, wherein the synchronizing device with the help of the cylinders exert force on the bolts for the securing thereof and with the advantage of being able to releasing by the same synchronizing device housed in the nut driving wrench which may be hydraulically and manually used.

15 Claims, 5 Drawing Sheets

AUTO-ADJUSTABLE BEARING WRENCH

TECHNICAL FIELD OF THE INVENTION

Drive wrenches for nuts in general may be of every shape and design, particularly in the area where the nut to be manipulated is placed. Nowadays, there is a great range of sizes and designs of nut flats, screw heads, wheel stud heads or similar, which are manufactured in this way to control their maneuvering and to achieve the adequate pressure for their torque. The use of this type of wrenches is common in industry, as well as in daily life, where a nut is required to be unscrewed, loosened, screwed and tightened. The wrench of the present invention is a high torque wrench for every kind of nut which has the characteristic of not wearing down or damaging the edges of the screw heads thanks to the use of auto adjustable bearings.

BACKGROUND OF THE INVENTION

In the market, there is a wide variety of wrenches for actuating ratchet nuts, as commonly known in the field of mechanics. An example of this is the U.S. Pat. No. 7,458,295 B1, which describes an interchangeably manual or automatic tool, comprising a tool body including one of the ends of a grove. The tool comprises a rotating member, having peripheral teeth and driven teeth formed therearound, respectively. The tool body further including a piece leading to two engaging tabs mounted thereon for engaging with peripheral teeth of said rotating member, thereby driving the rotating member in a manual operation mode. Moreover, the tool body includes a motor driven by a power source assembly and affixed at another end thereof, the motor includes a worm shaft disposed at one end thereof, for meshing with a worm gear which is rotatably disposed in the tool body. Between the worm gear and the driven teeth of the rotating member is defined with a transmission set for couplingly urging the rotating member in an electric operating mode. This tool functions as grip for the screw heads by a series of teeth at the inner side of the head, wherein the nut is housed in order to be manipulated through the aid of a motor. The tool has the disadvantages of not having enough torque for big or small nuts, of not having a self-contained operation, as is the case with the present invention.

On the other hand, U.S. Pat. No. 7,444,902 B1 describes a ratchet wrench, which a user may operate in manual operation manner by the use of mechanical power at one of its ends. The operation being substantially based on gears and shafts attached to said gears. This tool has the disadvantage of not having enough torque for big or small nuts, of not having self-contained operation and of only allowing to assist nuts of specific measures.

Another example of ratchet tool is disclosed in U.S. Pat. No. 6,070,499, which comprises a ratchet tool having an elongated body with a hollow head, where the nut is housed, the hollow has a series of stationary teeth that are used to grip the nut and to exert pressure either for screwing or unscrewing operations. It includes a rotary member within the handle, which is rotatable about a second axis, and a drive ring which extends around the drive member. This tool has the disadvantage of not having enough torque for big or small nuts, besides, the teeth don't adjust to the different shapes and sizes of the nuts without the edges of the nut being deteriorated or worn out.

BRIEF DESCRIPTION OF THE INVENTION

The present invention refers to an auto-adjustable bearing wrench for nuts, screws, wheel studs, bolts and similar (in the present application generically referred to as nuts) from different sizes that may be used in a great variety of nut designs regardless of their shape, design and size, without damaging their edges.

International tolerancing standards regarding the nut flat measures are usually too big, particularly when high torques are executed, in the case of big pieces.

Due to a high tolerance, when high torques are executed the typical issues of wear of the flats apexes arise, both in nuts and in nut tightening and loosening wrenches. The result is a quick wear of the nut, as well as work accidents due to an excessive clearance of the tools which are currently in the market.

The present invention overcomes said clearance issues, and provides a simple tool which supplies high torques without the need of compressors, connection cables and other logistic issues usually required in big nuts.

In a preferred embodiment, the auto-adjustable bearing wrench of the present invention comprises a casing (1) having a plurality of housings (14); two bearing guide boxes (4, 4') contained within the casing; a plurality of bearings (2*a*-2*l*) each having an axis (12); each of the bearing guide boxes (4, 4') comprising a plurality of key-shaped hollow areas (11); each of the bearings being coupled between the bearing guide boxes (4, 4') introducing the axis (12) into each key (11), whereby each bearing may be separately displaced inside and outside its corresponding housing; at least one key (15) in a face of the casing (1), comprising a spring (3) and a connection cylinder of the boxes (8), the spring (3) is attached in one end to the connection cylinder of the boxes (8) and the other end of the casing (1); wherein the spring (3) pulls the connection cylinder of the boxes (8) counterclockwise to the torque direction of the casing (1), whereby the bearing guide boxes (4, 4'), through the key-shaped hollow areas (11) and the axis (12) cause the bearings to be displaced to the outmost portion of the housings (14) of the receiving casing (1); and wherein upon rotating the casing in the torque direction (clockwise) the connection cylinder of the boxes (8) forces the spring (3) causing the boxes (8) to rotate counterclockwise to the torque direction, whereby the bearing guide boxes (4, 4"), through the key-shaped hollow areas (11) and the axis (12) cause the bearings to be displaced to the innermost part of the housings (14) of the receiving casing (1) until it makes contact with a nut located between the bearings.

BRIEF DESCRIPTION OF THE DRAWINGS

The present invention will become more evident from the following description when taken in connection with the accompanying drawings, wherein.

ELEMENTS OF THE TOOL

Figure 1:
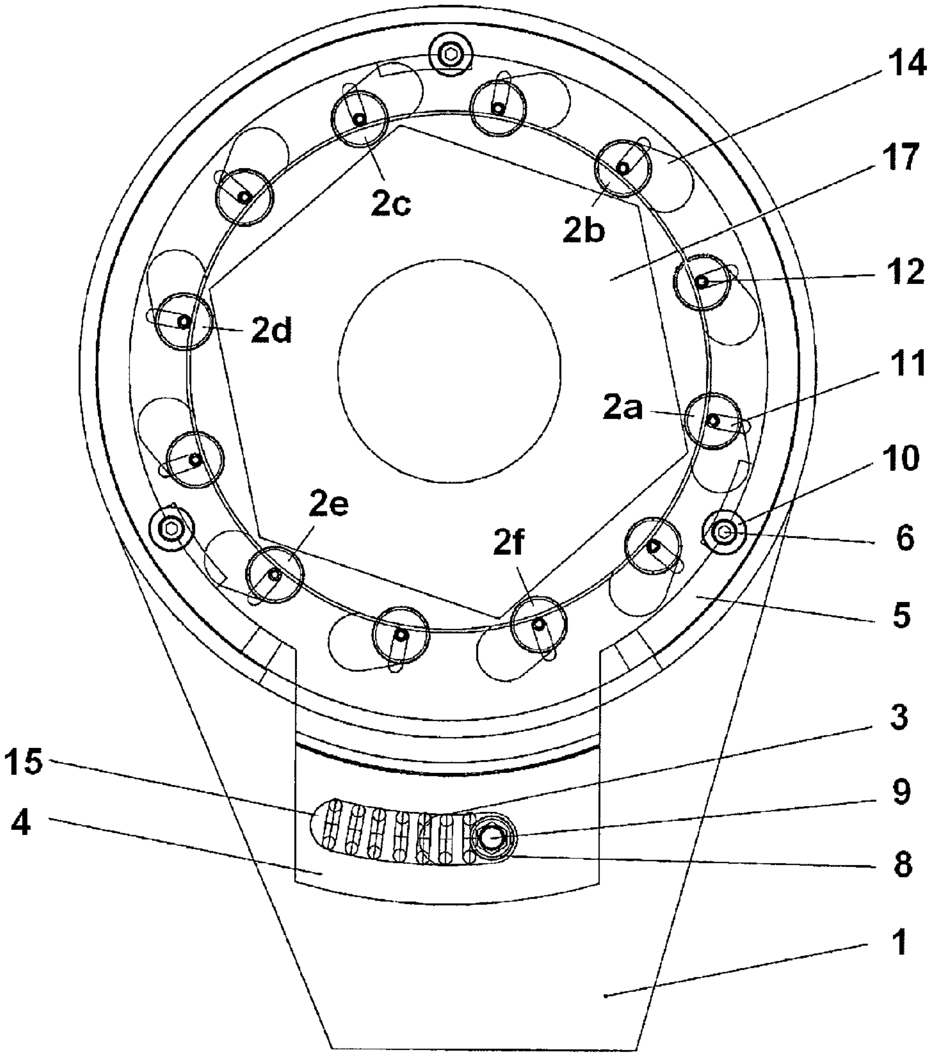
FIG. 1 shows a bearing tool in operation, wherein it may be seen that the bearings touch the flats of the nut and not the edges.
Figure 2:
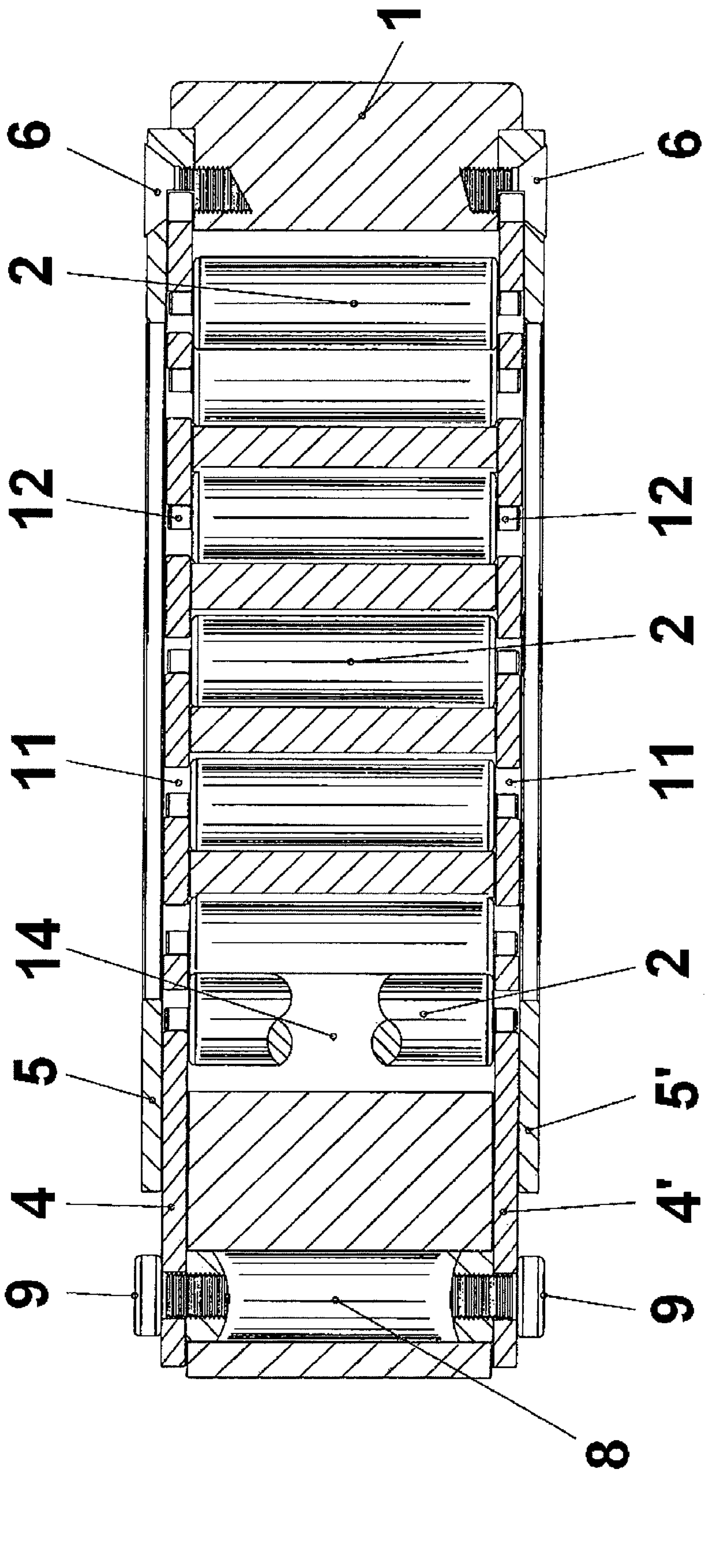
FIG. 2 shows a side view of the tool, and the placement of the bearings within the tool.

1. Receiving casing of the driving bearings
2*a*-2*l*. Bearings
3. Spring
4. Bearing guide box
5. Closing cap
6. Closing cap screw
7. Through holes for bolts
8. Connection cylinder boxes
9. Screws for Connection cylinder boxes
10. Threaded holes for cap screws
11. Key-shaped perforated area of the bearing guide boxes
12. Bearing shaft
13. Bolt holes chamfer
14. Housing of the casing bearing receivers
15. Spring key
16. Driving handle (only in manual)
17. Nut

DETAILED DESCRIPTION OF THE INVENTION

In an embodiment of the present invention, as shown in FIG. 1, the bearing wrench exerts force through bearings and/or auto-adjustable cylinders (2*a*-2*l*). Nuts or screw heads (17) may have any number of flats, being these generally square, or in multiples of 4 (4, 8, 12); hexagonal, or in multiples of 6 (6, 12, 18), the number of flats isn't restrictive, that is the wrench may act in square, pentagonal, hexagonal, octagonal sections, etc.

The auto-adjustable bearing wrench, as shown in FIG. 1, may have a variable number of bearings, depending on the type of nut where it is going to be used, however, for illustrative purposes of the following description, the number of bearings is twelve, but this in no way indicates that this is the only embodiment of the present invention.

The number of bearings shall determine the grades necessary to carry out the "reassembly" of the wrench, that is, once a torque is executed on a nut with the resulting turn of certain grades usually in clockwise direction, and a greater clockwise turn is required, it is necessary to return to the starting position with a counterclockwise turn without loosening the nut, having then a new angle of clockwise turn on the nut, necessary for keep on tightening the nut. For example, in an hexagonal nut, if the bearings are 12, the wrench shall be reassembled with a turn of 30°.

FIGS. 1 to 4 show the auto-adjustable bearing wrench comprising a casing 1, twelve housings (14), preferably, without limiting, bearing receptors 2*a*-2*l*; three holes (10) angularly equidistant and threaded for receiving three screws (6); two caps (5); two bearing guide boxes (4) containing twelve preferably key-shaped perforated areas (11); twelve bearings (2*a*-2*l*), each including an axis (12); a key (15) on each side of the casing (1), in order to mount a spring (3) on each face; a threaded cylinder (8); two screws (9) and a handle (16).

In reference to FIG. 1, in order to make a tightening/loosening maneuver, the bearing wrench is set in the adequate measure of the nut (17) intended to be operated. In case of tightening, the spring (3) drives the cylinder (8) in a counterclockwise sense to the casing's direction of rotation (1), and therefore the boxes (4) through the key-shaped perforated areas (11) cause the bearings (2*a*-2*l*) to be always located in the innermost portion of the receiving casing (1). By rotating the key, the bearings start to rotate and to be displaced outside the keys of the boxes by the casing (1), and when the bearings (2*a*, 2*b*, 2*c*, 2*d*, 2*e*, 2*l*) come into contact with the respective nut flats they rotate the nut (17) in clockwise direction. The bearings are guided through the key-shaped perforated areas (11) and through the housings (14) of the housing, in such a way that each bearing has a separate path adapting itself to its corresponding nut flat (17), regardless of the fact that the nut flats are not evenly spaced.

In FIG. 1 for reassembly of the wrench, a counterclockwise turn is provided; upon rotating the casing (1) counterclockwise, said bearings (2*a*, 2*b*, 2*c*, 2*d*, 2*e*, 2*f*) are introduced in the outermost part of the housing (14) with respect to the center of the wrench, due to the fact that the edge of each flat in its counterclockwise rotation forces the bearings (2*a*-2*l*) to be introduced in the hollows so to be able to rotate the casing (1). In a layout of twelve bearings, a rotation of 30° counterclockwise is required in order to reassemble the wrench to an hexagonal nut.

In order to loosen a nut, do counterclockwise rotations with reference to the tightening according to clockwise rotations, the tool is simply turned around and the operation is carried out.

In the tightening operation, the connection cylinder of the boxes is located at the right side of the spring, instead, when the wrench is rotated in order to execute a loosening maneuver, the spring is located at the left side of the connection cylinder of the boxes. This is due to the fact that in a tightening rotation (clockwise) the spring (3) drives the connection cylinder (8) of the boxes (4) in a counterclockwise direction so that upon turning in a clockwise direction the receiving casing of the bearings (2*a*-2*l*) "finds" each bearing and places it over the nut flat, tightening it.

It's the same in the loosening maneuver, that is, the spring (3) tightens the connection cylinder (8) of the boxes (4) in counterclockwise direction to the rotation of the bearing (2*a*-2*l*) receiving casing (1).

The springs (3) which are housed in the key (15) of the main casing (1) receiving the bearings are housed in such a way that they abut against one side with the same support that houses it and on the other they exert pressure over the connection cylinder of the boxes (8). There is a space in the key that communicates the two faces so that the connection cylinder (8) of the boxes may be displaced approximately 10 mm in the embodiment illustrated, which is necessary so that the bearings may be hidden in the keys (11) that are open in the reassembly operation.

There may be a key (15) and a spring (3) on each face of the support so that the connection cylinder (8) between boxes works better. The work may be done with just one springs, though less efficiently. The boxes include key-shaped elongated slots (11) for each roller, which function as bearing guides in its way from the outermost or reassembly part to the innermost or force part, with reference to the center of the bearing receiving casing.

The preferred embodiment includes two springs (3) one on each face of the casing (1) for a better work on the connection cylinder (8) of the boxes (4) bearing guides (2*a*-2*l*), and it can also include just one springs, but with certain unbalance. The spring (3) is housed in the key (15) in each face of the casing (1). The key (15) is hollow to be able to hold the bearings, the bearings are enclosed in closing caps (5), one in each face of the casing (1). Both key-shaped elongated slots (15) are in communication so that the connection cylinder (8) between boxes (4) is moveable, in the illustrated embodiment approximately 10 mm, in the operation of displacement between bearings (2*a*-2*l*).

The bearings (2*a*-2*l*) are located by the two springs (3), one in each face, which are interconnected by the connection cylinder (8) of the boxes (4). The two springs (3) press the connection cylinder (8) of the boxes (4) which in turn force the axes (12) of the bearings, to be placed at the innermost portion of the bearing receiving casing (1).

The function of the connection cylinder (8) of the boxes (4) is to cause the two guide boxes of the bearings to work in a synchronized way, that is, as one single body, besides maintaining the bearings position stationary if there is no rotation of tightening/loosening.

The measure of the bearings doesn't depend on the box; the box has the function of not letting the bearings go out of their action line; whether big or small, the box has a set thickness, for example of 2 mm, since it doesn't exert any stress (all the stress is exerted by the receiving casing, its sole function is to guide the forward backward movement of all the bearings, besides not letting them out from their position.

The bearings (2*a*-2*l*) may have different diameters, this is due to the fact that the bearing diameter determines the tensile zone where the nut flat will act upon (this together with the housing angle in the casing); that is if the diameter of the bearing is greater, it shall be able to tension further from the apex of the nut, and if the diameter of the bearing is smaller, it shall tense nearest to the apex of the nut.

Bearings (2*a*-2*l*) may have different heights in function of the nut, one bigger nut, therefore of more height, requires a longer bearing. The premise is that the bearing and the caps have the height similar to that of the nut, in order to take advantage of the contact zone of the bearing with the nut; the bigger the contact surface, the better the stress will be distributed and therefore the greater the capacity will be.

As a non restrictive example, bearing wretches of a very small diameters, for example of 0.1 mm, may be manufactured for odontology tools, or otherwise gigantic wrenches with 20 mm diameter bearings to execute operations in nuts of more than 6 inches (15.24 cm).

Set screws (6) (3 units at 120°) of the box and the caps (5) of the casing are disposed in the outmost part, and may be of small diameter (4 mm) since their only function is to hold the outer caps in order to seal the key and to operate as guide-cap together with the boxes.

When the casing rotates counterclockwise (reassembly), the bearings (2*a*-2*l*) are housed in the outmost portion of the housing (14). As the nut edges contact their nearest respective bearing, it begins to introduce itself into the housing (14), each in a separate way, thanks to the travel of each bearing into the box. Once the edge of the nut has passed, the spring (3), through the connection cylinder (8) of the boxes (4), forces each bearing to its original stationary position (the furthest part from the center of the casing). The caps (5) and the boxes (4) don't support any tensile strength, their only function is to guide.

The two boxes (4) are united by a connection cylinder (8) so that their rotation with respect to the casing (1) is synchronized. The cylinder is threaded by both ends in order to be able to install a screw (9) in each end so that everything acts as a whole body. The boxes (4) have a plurality of elongated slots (11) so that the bearings are displaced from inside out from the receiving casing. By default, the spring (3) usually drives the bearings into the inner part of the casing, through the spring (3) that pushes the connection cylinder (8) from the boxes (4).

The casing (1) which houses the bearings (2*a*-2*l*) is the one that will determine the maximum torque capacity that the wrench may exert.

The height of the casing (1) together with the thickness of the weakest part will determine the torque that may be applied to it.

As has been mentioned, the height of the casing (1) determines the height of the bearings. These heights are determined by the height of the nut. Special nuts of greater height may receive wrenches of greater heights, and therefore, bearings of greater height; special nuts of heights lower than the standards of the market may receive wrenches of lower height and therefore bearings of lower height.

If necessary, nuts made from less resistant materials (for example aluminum) may conform wrenches of lower height and therefore bearings of lower heights, since they will require a lower torque.

Figure 3:
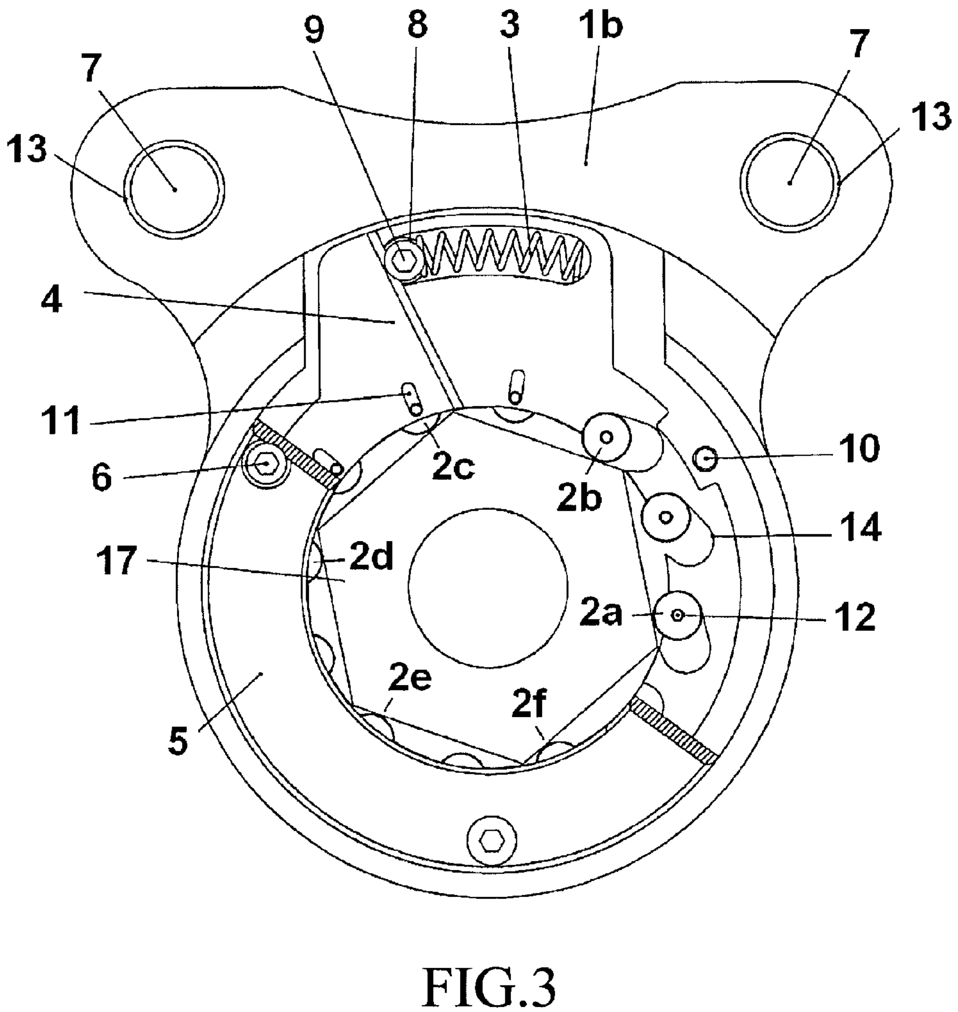
FIG. 3 shows a bearing tool in operation, wherein it may be seen that the bearings touch only the flats of the nut and not the edges, in an embodiment that may be mounted in a support and a further tool.
Figure 4:
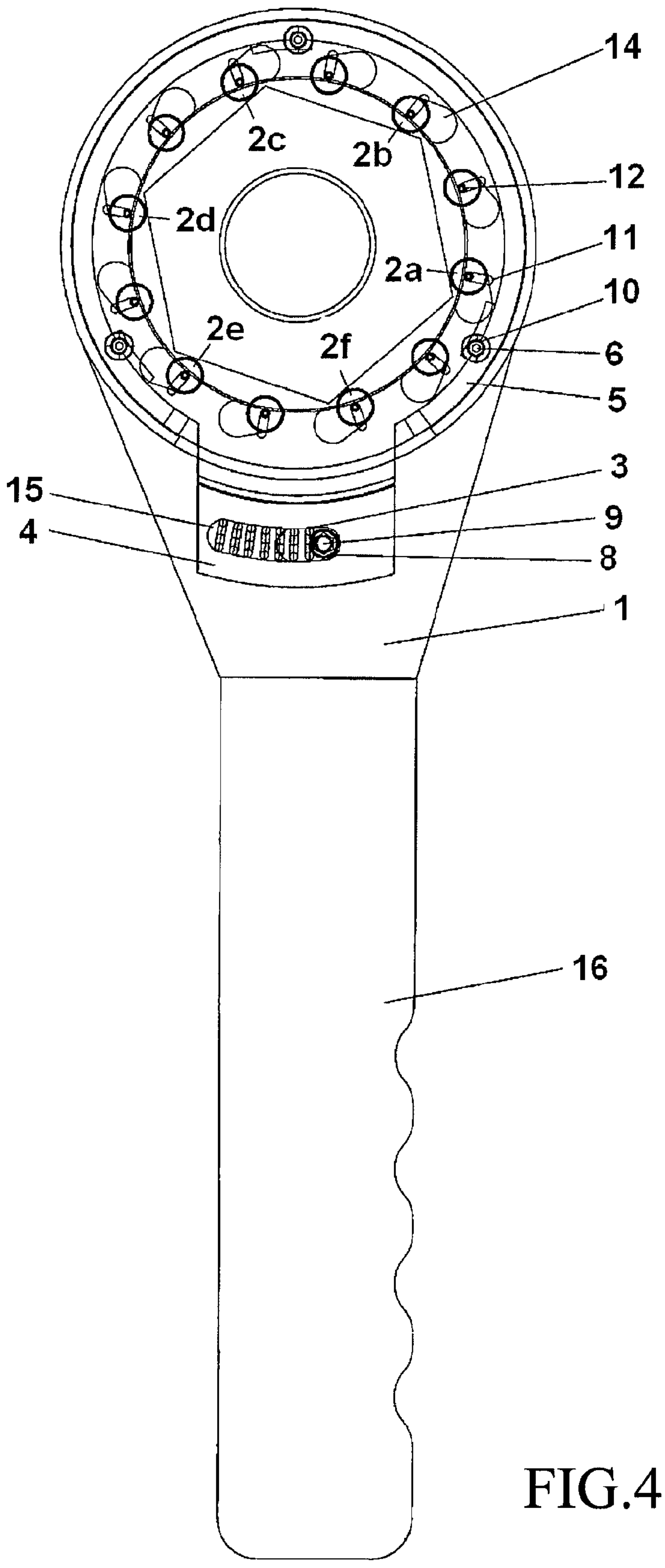
FIG. 4 shows a bearing tool in operation, wherein the bearings may be seen touching only the flats of the nut and not the edges, in an embodiment with a handle for the manual embodiment.
Figure 5:
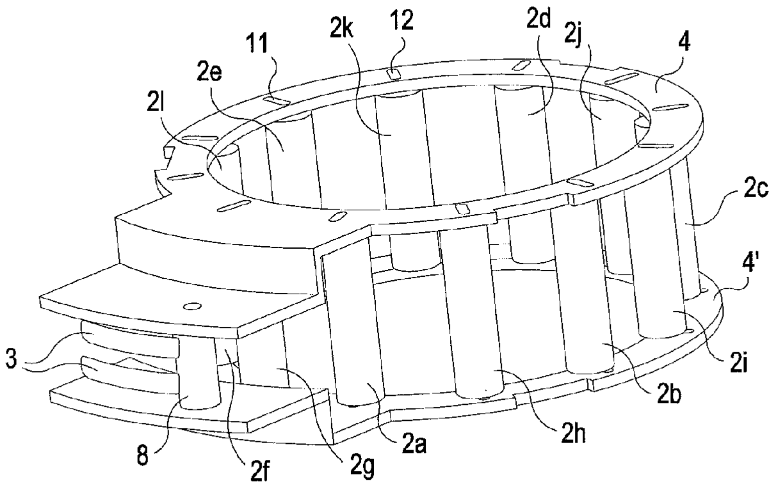
FIG. 5 shows the bearing guide boxes (4 *y* 4'), the bearings (2*a*-2*l*), the springs (3), the connection cylinder of the boxes (8), and the axis (12) of each bearing.

In FIG. 3, an alternative embodiment is illustrated, wherein the casing comprises a projection (1*b*) having two holes (7), which include a chamfer (13) on each side. This embodiment of the invention is useful in applications that require a high torque, wherein the bearing wrench is connected to other tool, which may be of an hydraulic type, through the holes (7).

Therefore, those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto-adjustable bearing wrench comprising:

a casing that has a plurality of housings;

two bearing guide boxes contained within the casing;

a plurality of bearings having each an axis;

each of the bearing guide boxes comprising a plurality of key-shaped hollow areas;

each of the bearings is coupled between the bearing guide boxes introducing the axis in each key, whereby each bearing may be separately displaced inside and outside of its corresponding housing;

at least one key in a face of the casing, comprising a spring and a connection cylinder of boxes, the spring is attached in one end to the connection cylinder of boxes and the other end of the casing;

wherein the spring pulls the connection cylinder of the boxes in the direction opposite to a torque direction to the torque direction of the casing, whereby the boxes of the bearing guide, through the key-shaped hollow areas and the axis cause the bearings to be displaced to the outmost part of the housings of the receiving casing; and wherein upon rotating the casing in the torque direction the connection cylinder of boxes pushes the spring causing boxes to rotate in the direction opposite to the torque direction to the torque direction, whereby the bearing guide boxes, through the key-shaped hollow areas and the axis cause the bearings to be displaced to the innermost part of the housings of the receiving casing until making contact with a nut placed between the bearings.

2. The auto-adjustable bearing wrench according to claim 1, comprising a key in each of the faces of the casing, each of the keys comprising a spring attached to the connection cylinder of boxes, the springs are attached in one end to the connection cylinder of the boxes and the other end of the casing.

3. The auto-adjustable bearing wrench according to claim 1, wherein the key reassembly is carried out by giving a turn in the direction opposite to the torque direction, whereby the bearings, on rotating the casing in the direction opposite to the torque direction, are displaced to the outmost part of the housing with respect to the center of the wrench, due to the fact that the edge of each nut flat placed between the bearings, when rotating in the direction opposite to the torque direction forces the bearings to be displaced within the housings and being able to rotate the casing.

4. The auto-adjustable bearing wrench according to claim 3, wherein the number of bearings determines the grades of backward movement necessary to execute the reassembly of the wrench.

5. The auto-adjustable bearing wrench according to claim 1, wherein the casing is attached to a handle which allows the rotation of the tool.

6. The auto-adjustable bearing wrench according to claim 1, wherein the casing comprises a projection having two holes which allow to use the wrench together with an hydraulic tool in order to achieve high torques.

7. The auto-adjustable bearing wrench according to claim 1, wherein the bearings are preferably cylindrical.

8. The auto-adjustable bearing wrench according to claim 1, wherein the bearings may be triangular, semicircular, rectangular or square in shape.

9. The auto-adjustable bearing wrench according to claim 1, wherein the number of bearings and housings is 4, or a multiple of 4.

10. The auto-adjustable bearing wrench according to claim 9, wherein for 4 bearings, 90 degrees of backward movement are necessary for reassembly.

11. The auto-adjustable bearing wrench according to claim 9, wherein for 6 bearings, 60 degrees of backward movement are necessary for reassembly.

12. The auto-adjustable bearing wrench according to claim 1, wherein the number of bearings and housings is 6, or a multiple of 6.

13. The auto-adjustable bearing wrench according to claim 1, further comprising two caps attached to the casing by three screws, one in each of the faces of the casing.

14. The auto-adjustable bearing wrench according to claim 13, wherein the bearing plus the caps have the approximate height of the nut.

15. The auto-adjustable bearing wrench according to claim 1, wherein the height of the bearings depends on the height of the nut to be tightened or loosened.

* * * * *